United States Patent
Aldover et al.

(10) Patent No.: US 10,629,039 B1
(45) Date of Patent: Apr. 21, 2020

(54) ELECTRONIC MONITORING SYSTEM WITH GEOGRAPHIC LOCATION

(71) Applicant: Arlo Technologies, Inc., Carlsbad, CA (US)

(72) Inventors: Dennis Aldover, Carlsbad, CA (US); Dnyanesh Patil, Fremont, CA (US); Velabhai Bhedaru, San Jose, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 0 days.

(21) Appl. No.: 16/220,146

(22) Filed: Dec. 14, 2018

(51) Int. Cl.
*G08B 13/00* (2006.01)
*G08B 13/196* (2006.01)
*H04W 4/02* (2018.01)
*H04L 29/12* (2006.01)

(52) U.S. Cl.
CPC . *G08B 13/19656* (2013.01); *G08B 13/19602* (2013.01); *H04L 61/2007* (2013.01); *H04L 61/609* (2013.01); *H04W 4/025* (2013.01)

(58) Field of Classification Search
CPC ........ G08B 13/19656; G08B 13/19602; H04L 61/2007; H04L 61/609; H04W 4/025
See application file for complete search history.

(56) References Cited

U.S. PATENT DOCUMENTS

| | | | |
|---|---|---|---|
| 8,770,477 B2 | 7/2014 | Hefetz | |
| 9,026,145 B1 | 5/2015 | Duleba et al. | |
| 9,867,025 B2* | 1/2018 | Cho | H04W 64/00 |
| 2009/0195655 A1* | 8/2009 | Pandey | G08B 13/19647 348/158 |
| 2016/0127695 A1* | 5/2016 | Zhang | H04N 5/23206 348/143 |
| 2017/0238129 A1* | 8/2017 | Maier | H04W 4/14 455/404.2 |
| 2018/0249069 A1* | 8/2018 | Rakshit | G08B 21/0476 |

* cited by examiner

Primary Examiner — Khai M Nguyen
(74) Attorney, Agent, or Firm — Boyle Fredrickson S.C.

(57) ABSTRACT

An approximate physical geographic location (geolocation) of a video monitoring system for security and/or surveillance can be determined with high confidence by co-locating the monitoring system and a mobile device on a common local network and associating a sensed geolocation of the mobile device with the monitoring system. The monitoring system and mobile device may be wireless Local Area Network (LAN) devices connected to a single router for accessing an application server through a Wide Area Network (WAN). The mobile device may connect to a Global Positioning System (GPS) for sensing the geolocation. This process can be used to determine where the monitoring system is physically installed by a user for providing support. An alarm initiated by the monitoring system can comprise dispatch of emergency services to the geolocation.

20 Claims, 3 Drawing Sheets

ELECTRONIC MONITORING SYSTEM WITH GEOGRAPHIC LOCATION

BACKGROUND OF THE INVENTION

1. Field of the Invention

The present invention relates to a camera-based electronic monitoring system, and more particularly, to determining a geographic location of a camera-based electronic monitoring system.

2. Discussion of the Related Art

Cameras have long been used as part of monitoring and/or surveillance systems. More recently, cameras have been coupled with electronic sensors to detect triggering events, such as a detected motion, to allow recording of an area once a triggering event has occurred. Video cameras have also been connected to computers with network access to allow a user to remotely monitor an area with a mobile device such as a smart phone, a tablet computer, or a laptop computer. Servers connected through the Internet can enable real time streaming from such cameras to the mobile device, along with alerts when triggering events occur.

Determining a physical geographic location for such a camera can be advantageous for providing support to the user. For example, it can be useful to know a physical location of a camera for sending technical support information through the mail. However, determining such a location with verification can be difficult. Oftentimes, a user is asked to electronically submit a street address corresponding to the location in which the camera is installed. A postcard is then sent to the street address through traditional mail service to permit the user verify the address. The postcard could include, for example, a code for the user to submit electronically to provide the verification. However, this process can be slow, inconvenient to the user, and susceptible to lost or damaged or lost mail. A need therefore exists for determining a physical geographic location for a camera which eliminates one or more of the foregoing disadvantages.

SUMMARY OF THE INVENTION

An approximate physical geographic location (geolocation) of a video monitoring system for security and/or surveillance can be determined with high confidence by co-locating the monitoring system and a mobile device on a common local network and associating a sensed geolocation of the mobile device with the monitoring system. The monitoring system and mobile device can be wireless Local Area Network (LAN) devices connected to a single network access equipment, such as a router, for accessing an application server through a Wide Area Network (WAN). The mobile device may connect to a Global Positioning System (GPS) for sensing the geolocation. This can advantageously determine where the monitoring system is physically installed by a user.

Specifically then, one aspect of the present invention can provide a method for electronic monitoring, including: obtaining a network address from an electronic monitoring system; obtaining a network address from a mobile device sensing a geographic location; comparing the network address of the electronic monitoring system to the network address of the mobile device to determine whether the electronic monitoring system and the mobile device are on a common network; and upon determining the electronic monitoring system and the mobile device are on a common network, using the geographic location of the mobile device for determining a location of the electronic monitoring system.

Another aspect of the present invention can provide a system for determining a location of an electronic monitoring system, including: an electronic monitoring system having a network address; a mobile device having a network address and sensing a geographic location; and a processor executing a program stored in a non-transient medium to: compare the network address of the electronic monitoring system to the network address of the mobile device to determine whether the electronic monitoring system and the mobile device are on a common network; and upon determining the electronic monitoring system and the mobile device to be on a common network, use the geographic location of the mobile device to determine a location of the electronic monitoring system.

These and other objects, advantages and aspects of the invention will become apparent from the following description. The particular objects and advantages described herein can apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
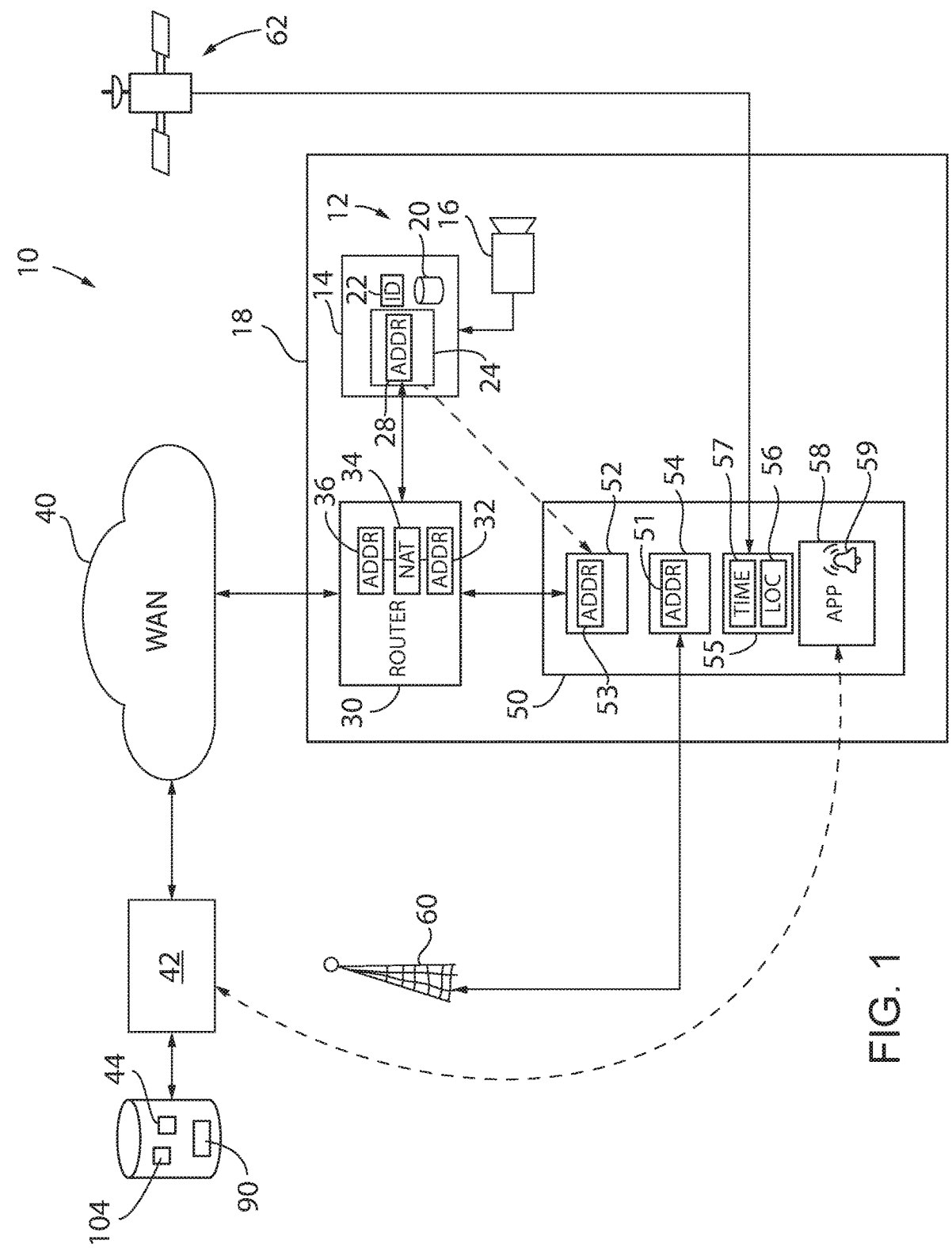
FIG. 1 is a diagram of a system for determining a location of an electronic monitoring system in accordance with an aspect of the invention.

Referring now to FIG. 1, in accordance with an aspect of the invention, a diagram illustrating a system 10 for determining a location of an electronic monitoring system 12 used for security and/or surveillance is provided in accordance with an aspect of the invention. The electronic monitoring system 12 could comprise a wireless base station 14 in communication with one or more wireless video cameras 16 configured for video and/or audio recording of an area 18 which could be an office building, house or other area of interest. The base station 14 could include: a storage element 20 for buffering real time video and/or audio streaming from the video cameras 16; a non-volatile memory storing an identifier 22 ("ID") that is unique to the particular monitoring system 12; and/or a network module 24, which could comprise an IEEE 802.11 Wi-Fi module and antenna, for communicating with a network access equipment 30 in the area 18.

The network access equipment 30 could comprise a router having a default local network address 32, such as an Internet Protocol version 4 (IPv4) home network address of 192.168.1.1, and a network address translator 34 providing Network Address Translation (NAT) or remapping of the local network address 32 to a public network address 36, such as an IPv4 public network address of 172.16.254.1, which could be statically or dynamically assigned for communicating over a Wide Area Network (WAN) 40 such as the Internet. The monitoring system 12 can join the network (or subnet) provided by the network access equipment 30, with a monitoring system local network address 28, such as an IPv4 local network address of 192.168.1.2, assigned by the network access equipment 30 to the monitoring system 12. Through the network access equipment 30, the monitoring system 12 can then communicate over the WAN 40 with a network service 42 or server which could, in turn, be used to stream the video and/or audio to a user through a mobile device, such as mobile device 50. The network service 42 can recognize the monitoring system 12 as a subnet device on a local network of the network access equipment 30, such as such as an IPv4 public network address of 172.16.254.2, also referred to as 28' in FIG. 3. In another aspect, when the monitoring system 12 and the mobile device are proximal to one another in the area 18, the monitoring system 12 may, if desired, be configured to stream the video and/or audio to the user through the mobile device directly, bypassing the network access equipment 30 and the network service 42.

In accordance with an aspect of the invention, an approximate physical geographic location (geolocation) of the monitoring system 12 can be determined with high confidence by co-locating the monitoring system 12 and a mobile device 50 on a common local area network provided by the network access equipment 30 and by associating a sensed geolocation of the mobile device 50 with the monitoring system 12. The mobile device 50, which could be a smart phone, a tablet computer, a laptop computer, or any other manually accessible capable of interfacing with the network or subnet and capable of being transported, could include: a network module 52, which could comprise an IEEE 802.11 Wi-Fi module and antenna, for communicating with the network access equipment 30 in the area 18; an optional cellular module 54, which could comprise a cellular communications system and antenna for communicating with a cellular data network 60; and a location module 55. Location module 55 comprise a Global Positioning System (GPS) and/or an antenna-based system for communicating with a geolocation service, such as satellites 62 and/or antennas for precise geolocation sensing. The mobile device 50 may additionally include a processor executing an application module 58 providing a Graphical User Interface (GUI) on a touchscreen for receiving user input, interacting with an application interface 44 executing on the network service 42, and/or receiving real time video and/or audio streaming from the video cameras 16.

Like the monitoring system 12, the mobile device 50 can join the network (or subnet) provided by the network access equipment 30 with a mobile device local network address 53, such as an IPv4 local network address of 192.168.1.3, assigned by the network access equipment 30 to the mobile device 50. Through the network access equipment 30, the monitoring system 12 can then communicate over the WAN 40 with the network service 42 which could, in turn, stream the video and/or audio to a user through the application module 58. When communicating through the network access equipment 30, the network service 42 can recognize the mobile device 50 as another subnet device on the local network of the network access equipment 30, such as an IPv4 public network address of 172.16.254.3, also referred to as 53' in FIG. 3. However, in contrast, the mobile device 50 could optionally be configured to communicate over the cellular data network 60 with the network service 42 at times, using a cellular network address 51, such as in the event of a loss of connectivity through the network access equipment 30.

In addition, through the location module 55, the mobile device 50 can sense and receive location information comprising a precise geographic location 56 ("LOC") (geolocation) and synchronized time 57 ("TIME") from the location service which may include satellites 62 and/or antennas. The geolocation 56 can comprise, for example, a latitude coordinate, a longitude coordinate and/or an elevation of the mobile device 50 at the time 57. As described herein, the location module 55 can be used to advantageously determine where the monitoring system 12 is physically installed by a user at a particular time for providing support based on the sensed location of the mobile device 50 and the common connection of the monitoring system 12 and the mobile device 50 to the network access equipment 30.

Figure 2:
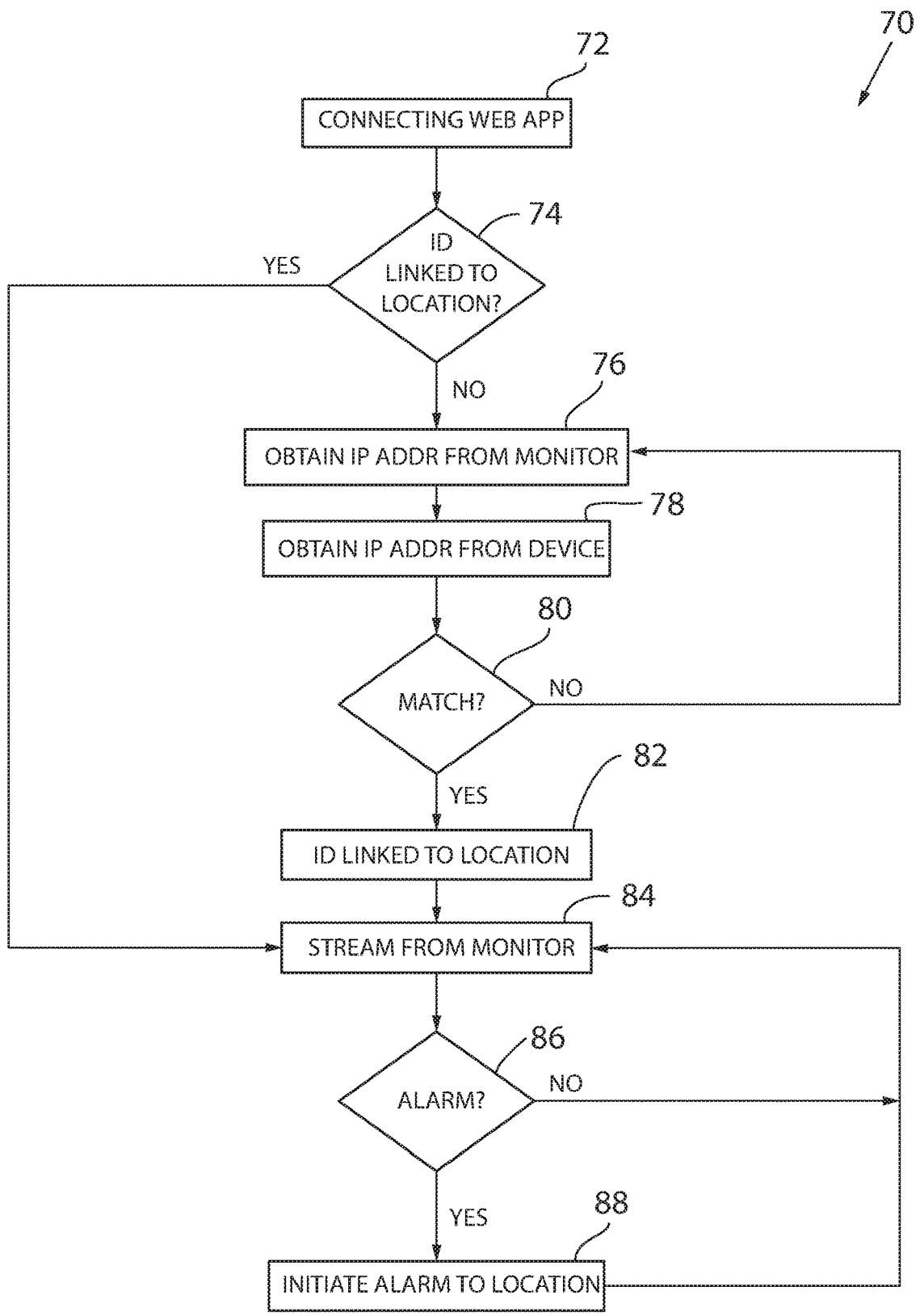
FIG. 2 is a flow chart of a process for determining the location of the electronic monitoring system of FIG. 1.

Referring now to FIG. 2, a flow chart 70 illustrates a process for determining the location of the monitoring system 12. At step 72, a connection can be established between the network module 24 of the monitoring system 12 and the application interface 44 of the network service 42 (through the network access equipment 30). This connection could be established automatically, for example, by the user powering up the base station 14. In addition, at step 72, a connection can be established between the application module 58 of the mobile device 50 and the application interface 44 of the network service 42. This latter connection could be established, for example, by the user starting an app on the smart phone or tablet computer or by launching a program on a laptop computer. For determining the location of the monitoring system 12, this latter connection could can be made through the network module 52 and the network access equipment 30.

Next, at decision step 74, the system can retrieve the identifier 22 from the monitoring system 12 and determine whether the identifier 22 is already linked or associated with a location. If the identifier 22 is not linked with a location ("No"), the system can proceed to step 76 in which a network address obtained from the monitoring system 12 is analyzed. The network address from the monitoring system 12, connected through the network access equipment 30, could be, for example, the public network address of 172.16.254.2. Then, at step 78, a network address obtained from the mobile device 50 is analyzed. At decision step 80, the network address of the monitoring system 12 is compared to the network address of the mobile device 50 to determine whether the monitoring system 12 and the mobile device 50 are on a common network.

Figure 3:
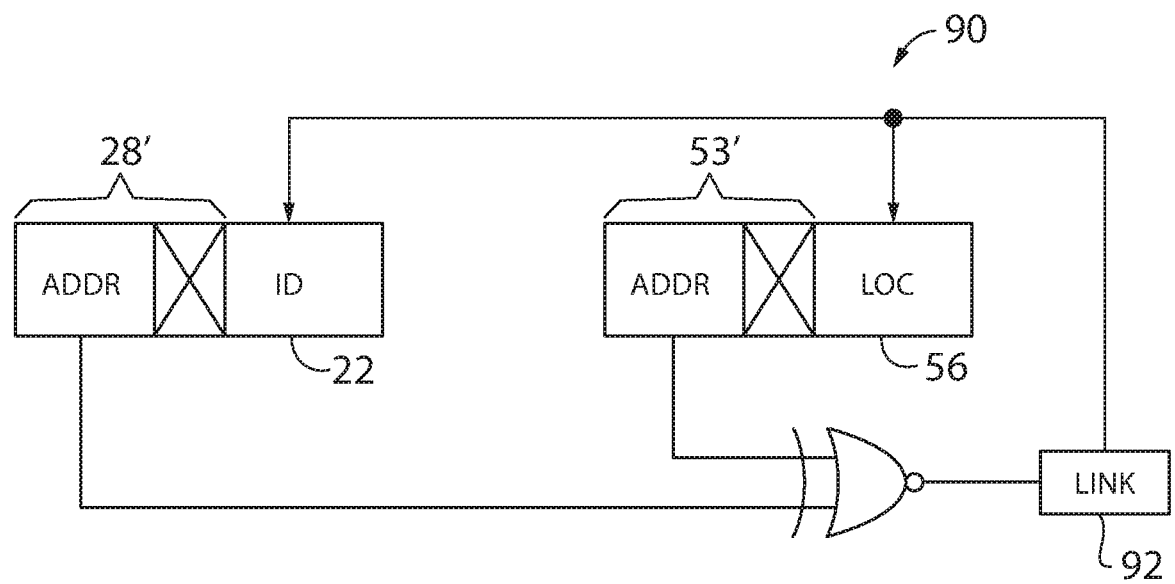
FIG. 3 is a diagram illustrating determining an electronic monitoring system and a mobile device to be on a common network for linking a geographic location of the mobile device to the electronic monitoring system of FIG. 1.

With additional reference to FIG. 3, a diagram 90 illustrating determination by the network service 42 of whether the monitoring system 12 and the mobile device 50 are on a common network for linking a geographic location of the mobile device 50 to the monitoring system 12 is provided in accordance with an aspect of the invention. In particular, the network service 42 can compare the local network address portion of the public network address 28' of the monitoring system 12 to the local network address portion of the public network address 53' of the mobile device 50. The local network address portions exclude respective subnet portions of the addresses which are indicative of devices connected to the local network. The addresses can be compared, for example, using an exclusive nor ("XNOR") function, sometimes called an "equivalence gate," which produces a high output (1) result only if both inputs to the gate are the same. If the mobile device 50 is connected through the network access equipment 30, the local network address portion of the public network address 53' of the mobile device 50 will be equivalent to the local network address portion of the public network address 28' of the monitoring system 12. For example, if the mobile device 50 is connected through the network access equipment 30, the local network address portion of the public network address 53' might be 172.16.254.X, which may be equivalent to the local network address portion of the public network address 28' of the monitoring system 12, which is also 172.16.254.X. This action causes the network service 42 to establish a link 92 between the identifier 22 of the monitoring system 12 and the geolocation 56 of the mobile device 50. Referring back to FIG. 2, this action also corresponds to a successful match ("Yes") from decision step 80, causing a link to be established between the identifier 22 and the geolocation 56 at step 82. The system can then use the geolocation 56 of the mobile device 50 for determining a location of the monitoring system 12.

However, if the mobile device 50 is not connected through the network access equipment 30, but rather through the cellular module 54 and the cellular data network 60, or through a different network access equipment, the local network address portion of the public network address 53' of the mobile device 50 will not be equivalent to the local network address portion of the public network address 28' of the monitoring system 12. This action prevents the network service 42 from establishing the link 92 between the identifier 22 of the monitoring system 12 and the geolocation 56 of the mobile device 50. Referring back to FIG. 2, this also corresponds to a failed match ("No") from decision step 80 causing a return to steps 76 and 78 in which the network addresses obtained from the monitoring system 12 and the mobile device 50 are again analyzed for any changes in a loop. This loop can repeat until a match is achieved, which may be caused by the user accessing the monitoring system 12 and the mobile device 50 through the same equipment, thereby unlocking further access. However, in another aspect, the system can simply bypass the linking process and allow full access with real time video and/or audio streaming and attempt to link again later during a next established connection at step 72.

Referring again to FIG. 2, following a determined successful match at decision step 80 and link between the identifier 22 and the geolocation 56 at step 82, a determined existing link at decision step 74, or optionally a determined failed match at decision step 80, the system can proceed at step 84 to stream real time video and/or audio, and/or prerecorded video and/or audio, to the user, such as to mobile device 50. The video and/or audio can be stored in a server, such as a cloud computing environment, for later retrieval by the user.

At decision step 86, an alarm can be initiated in any or all of several ways. For example, the alarm can be initiated by detecting a motion or sound from the video or audio causing the alarm. As another example, the alarm can be initiated by receiving a user input from the mobile device 50, such as tapping an alarm icon 59 on the application module 58. If an alarm is not initiated ("No"), the process returns to step 84 in which video and/or audio streaming continues without alarm initiation. However, if an alarm is initiated ("Yes"), the process can proceed to step 88 in which the alarm is initiated with respect to the location of the monitoring system 12 while the system continues to stream real time video and/or audio.

Figure 4:
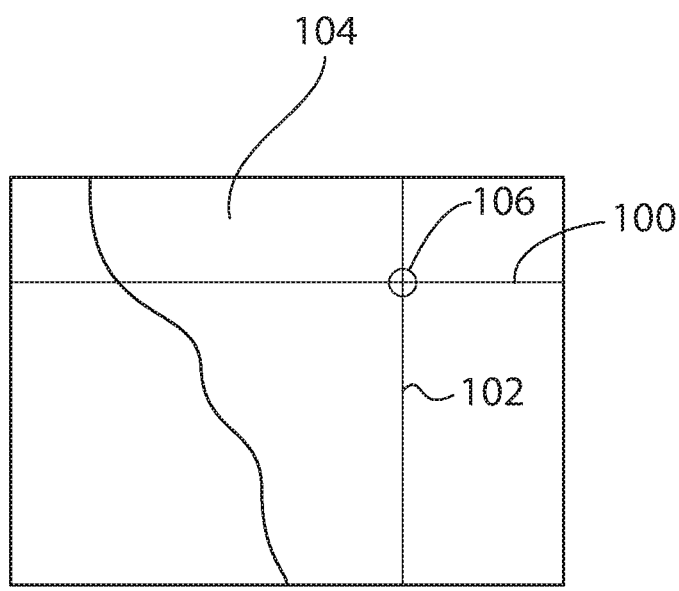
FIG. 4 is a diagram illustrating comparing a geographic location to a map for determining a street address in accordance with an aspect of the invention.

In one aspect, an alarm can comprise the dispatch of emergency services, such as police, fire and/or paramedics, contacted through an electronic message service from the network service 42, to the geolocation 56 corresponding to the monitoring system 12 (the area 18. Instead of or in addition to this dispatch, the alarm could comprise the generation of an audio and/or visual alarm at the area 18, such as lights and sirens. The message could include latitude and longitude coordinates corresponding to the geolocation 56, and/or could include a street address determined to correspond to the geolocation 56. For example, with additional reference to FIG. 4, the network service 42 can compare latitude and longitude coordinates 100 and 102, respectively, of the geolocation 56 to a street map 104 for determining a street address 106 matching the geolocation 56. Moreover, the network service 42 can compare elevation of the geolocation 56 to determine a floor of a building at the street address. Such dispatch can then comprise dispatch of emergency services through an electronic message service to the street address 106, In yet another aspect, the network service 42 can receive the street address 106 from user input to the mobile device 50. The network service 42 can then compare the street address 106 to the latitude and longitude coordinates 100 and 102, respectively, and/or elevation, of the geolocation 56 on the street map 104. Upon determining the street address 106 to match the geolocation 56 within a threshold, the network service 42 can further link the street address 106 to the monitoring system 12, including for initiating the alarm.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. A method for electronic monitoring, comprising:
obtaining a network address from an electronic monitoring system;
obtaining a network address from a mobile device sensing a geographic location;
comparing the network address of the electronic monitoring system to the network address of the mobile device to determine whether the electronic monitoring system and the mobile device are on a common network; and
upon determining that the electronic monitoring system and the mobile device are on a common network, using the geographic location of the mobile device for determining a location of the electronic monitoring system and associating the location with the electronic monitoring system.

2. The method of claim 1, further comprising the electronic monitoring system providing a real time video stream.

3. The method of claim 2, further comprising initiating an alarm.

4. The method of claim 3, wherein initiating the alarm comprises dispatch to the location of the electronic monitoring system.

5. The method of claim 3, wherein the initiating comprises, via operation of the electronic monitoring system, detecting a motion from the video causing the alarm.

6. The method of claim 3, further comprising receiving a user input from the mobile device to generate the alarm.

7. The method of claim 1, further comprising providing the electronic monitoring system as a wireless base station in communication with a video camera.

8. The method of claim 1, further comprising connecting the mobile device to a Global Positioning System (GPS) providing latitude and longitude coordinates for sensing the geographic location.

9. The method of claim 8, further comprising comparing the geographic location to a map and determining a street address.

10. The method of claim 9, further comprising initiating an alarm by dispatch to the street address.

11. The method of claim 8, further comprising receiving a street address from user input to the mobile device, comparing the street address to the geographic location, and, upon determining the street address to match the geographic location, associating the street address to the electronic monitoring system.

12. The method of claim 1, further comprising connecting the mobile device and the electronic monitoring system to a common router that arranges the electronic monitoring system and the mobile device on a common network.

13. The method of claim 1, wherein the network addresses are Internet Protocol (IP) address.

14. A system for determining a location of an electronic monitoring system, comprising:

an electronic monitoring system having a network address;
a mobile device having a network address and sensing a geographic location; and
a processor executing a program stored in a non-transient medium to:
compare the network address of the electronic monitoring system to the network address of the mobile device to determine whether the electronic monitoring system and the mobile device are on a common network; and
upon determining the electronic monitoring system and the mobile device to be on a common network, use the geographic location of the mobile device to determine a location of the electronic monitoring system and associating the location with the electronic monitoring system.

15. The system of claim 14, wherein the processor is configured to execute to initiate an alarm comprising dispatch to the location of the electronic monitoring system.

16. The system of claim 15, wherein the electronic monitoring system is configured to detect a motion or sound from the video to cause the alarm.

17. The system of claim 15, wherein the mobile device is configured to receive a user input to cause the alarm.

18. The system of claim 14, wherein the processor the processor is configured to compare the geographic location to a map to determine a street address.

19. The system of claim 18, wherein the processor is configured to initiate an alarm comprising dispatch to the street address.

20. The system of claim 14, wherein the mobile device is configured to receive a street address from user input, and further comprising the processor executing to compare the street address to the geographic location, and upon determining the street address to match the geographic location, associate the street address to the electronic monitoring system.

* * * * *